United States Patent
Suefuji (10) Patent No.: US 9,994,995 B2
(45) Date of Patent: Jun. 12, 2018

(54) STEEL CORD AND METHOD OF MANUFACTURING RUBBER PRODUCT

(71) Applicant: The Yokohama Rubber Co., LTD., Minato-ku, Tokyo (JP)

(72) Inventor: Ryotaro Suefuji, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 547 days.

(21) Appl. No.: 14/426,349

(22) PCT Filed: Sep. 5, 2013

(86) PCT No.: PCT/JP2013/073909
§ 371 (c)(1),
(2) Date: Mar. 5, 2015

(87) PCT Pub. No.: WO2014/038619
PCT Pub. Date: Mar. 13, 2014

(65) Prior Publication Data
US 2015/0211176 A1      Jul. 30, 2015

(30) Foreign Application Priority Data
Sep. 7, 2012   (JP) ................. 2012-196760

(51) Int. Cl.
*D07B 1/16* (2006.01)
*B29D 30/48* (2006.01)
(Continued)

(52) U.S. Cl.
CPC ............. *D07B 1/16* (2013.01); *B05D 7/20* (2013.01); *B29D 30/48* (2013.01); *D07B 1/06* (2013.01); *D07B 1/0613* (2013.01); *B05D 2202/10* (2013.01); *B05D 2256/00* (2013.01); *B05D 2530/00* (2013.01); *B29D 2030/483* (2013.01); *B65G 15/36* (2013.01);
(Continued)

(58) Field of Classification Search
CPC .......... D07B 1/06; D07B 1/0613; D07B 1/16; B05D 7/20; B29D 30/48
See application file for complete search history.

(56) References Cited

U.S. PATENT DOCUMENTS

| | | | |
|---|---|---|---|
| 4,938,437 A * | 7/1990 | Rausch | B29D 30/48 152/527 |
| 7,069,714 B2 * | 7/2006 | De Boni | D02G 3/385 57/210 |

(Continued)

FOREIGN PATENT DOCUMENTS

| | | |
|---|---|---|
| DE | 41 24 841 | 1/1993 |
| JP | H06-017388 | 1/1994 |

(Continued)

OTHER PUBLICATIONS

International Search Report for International Application No. PCT/JP2013/073909 dated Mar. 5, 2015, 4 pages, Japan.

*Primary Examiner* — Shaun R Hurley
(74) *Attorney, Agent, or Firm* — Thorpe North & Western (57) ABSTRACT

Steel cords have a stranded structure in which a plurality of sheath strands is intertwined around the outer circumferential surface of a core strand. The outer circumferential surface of the core strand is covered by a cushioning material made of nonwoven fabric or a resin film.

10 Claims, 6 Drawing Sheets (51) Int. Cl.
  *D07B 1/06*    (2006.01)
  *B05D 7/20*    (2006.01)
  *B65G 15/36*   (2006.01)

(52) U.S. Cl.
  CPC ........ *D07B 2201/2061* (2013.01); *D07B 2201/2065* (2013.01); *D07B 2201/2072* (2013.01); *D07B 2201/2074* (2013.01); *D07B 2201/2089* (2013.01); *D07B 2401/208* (2013.01); *D07B 2501/2046* (2013.01); *D07B 2501/2076* (2013.01); *D10B 2401/06* (2013.01); *D10B 2505/02* (2013.01)

(56) References Cited

U.S. PATENT DOCUMENTS

| | | | |
|---|---|---|---|
| 2004/0045652 | A1 | 3/2004 | Vanneste et al. |
| 2009/0008018 | A1* | 1/2009 | Okamoto ............ B29D 30/48 |
| | | | 152/540 |
| 2009/0229237 | A1* | 9/2009 | Imanishi ............ D02G 3/48 |
| | | | 57/204 |
| 2010/0267863 | A1* | 10/2010 | Furusawa ............ D02G 3/447 |
| | | | 523/200 |
| 2011/0209345 | A1* | 9/2011 | Kurosawa ............ D07B 7/145 |
| | | | 29/885 |
| 2012/0125512 | A1* | 5/2012 | Pottier ............ D07B 1/0633 |
| | | | 152/556 |
| 2012/0175035 | A1* | 7/2012 | Toussain ............ D07B 1/0633 |
| | | | 152/527 |
| 2012/0186715 | A1 | 7/2012 | Toussain et al. |
| 2013/0220505 | A1* | 8/2013 | Pottier ............ D07B 1/0633 |
| | | | 152/451 |
| 2014/0034208 | A1* | 2/2014 | Kurosawa ............ D07B 7/145 |
| | | | 156/51 |

FOREIGN PATENT DOCUMENTS

| | | |
|---|---|---|
| JP | 2003-294024 | 10/2003 |
| JP | 2004-522864 | 7/2004 |
| JP | 2005-248374 | 9/2005 |
| JP | 2008-285785 | 11/2008 |
| JP | 2012-036539 | 2/2012 |
| WO | WO 0244464 | 6/2002 |
| WO | WO 2011/000951 | 1/2011 |

* cited by examiner

STEEL CORD AND METHOD OF MANUFACTURING RUBBER PRODUCT

TECHNICAL FIELD

The present technology relates to a steel cord and a method of manufacturing a rubber product, and more specifically to a steel cord and method of manufacturing a rubber product that allow for suppression of reductions in cord strength caused by the heat of a vulcanization process.

BACKGROUND

Steel cords formed from intertwined steel wires are used as reinforcing material for rubber products such as tires, conveyor belts, and rubber hoses. One example is a stranded steel cord in which a plurality of sheath strands is intertwined around the outer circumferential surface of a core strand (for example, see Japanese Unexamined Patent Application Publication No. 2012-036539A). To manufacture these rubber products, a molded article is formed in which the steel cords constituting the reinforcing material are embedded in an unvulcanized rubber member, after which the molded article is heated at a predetermined temperature and compressed at a predetermined pressure in a vulcanization step to vulcanize the unvulcanized rubber.

In the case of stranded steel cords, the heat of the vulcanization process can make the cords brittle, increasing the occurrence of shearing and leading to a problematic reduction in cord strength. Increasing the diameter of the cord in order to suppress such reductions in cord strength introduces new problems such as increased cord weight and a reduction in flexibility. There is therefore a demand for a stranded steel cord that is capable of suppressing reduction in cord strength caused by the heat of a vulcanization process.

SUMMARY

The present technology provides a steel cord and a method of manufacturing a rubber product that allow for suppression of reductions in cord strength caused by the heat of a vulcanization process.

A steel cord according to the present technology is a stranded steel cord comprising a plurality of sheath strands intertwined around an outer circumferential surface of a core strand, characterized in that the outer circumferential surface of the core strand is covered by a cushioning material made of nonwoven fabric or a resin film.

Additionally, a method of manufacturing a rubber product according to the present technology is a method comprising vulcanizing a molded rubber article formed by embedding the above-mentioned steel cord in an unvulcanized rubber member at a temperature equal to or greater than the melting point of the cushioning material.

In accordance with the steel cord of the present technology, the outer circumferential surface of the core strand is covered by a cushioning material made of nonwoven fabric or a resin film, with the result that the cushioning material is interposed between the core strand and the sheath strands, absorbing and reducing shear stress acting upon the two. Shearing is thus inhibited even if the core is made brittle by the heat of the vulcanization process, allowing reductions in cord strength to be decreased.

The melting point of the cushioning material is, for example, 160° C. or less. The cushioning material can also be a nonwoven fabric having mass per unit area of at least 10 g/m² and not greater than 40 g/m². The cushioning material can also be wrapped in a spiral pattern around the core strand.

In accordance with the method of manufacturing a rubber product of the present technology, a molded rubber article formed by embedding the above-mentioned steel cord in an unvulcanized rubber member is vulcanized at a temperature equal to or greater than the melting point of the cushioning material, resulting in the cushioning material melting and melding with the vulcanized rubber following vulcanization and yielding good compatibility in addition to the effect yielded by the steel cord described above. This allows the adhesion between the vulcanized rubber and the steel cord and the durability of the adhered portion to be maintained at satisfactory levels.

The rubber product described above is, for example, a conveyor belt. A molded rubber article formed by embedding the steel cord as a core in the unvulcanized rubber member is vulcanized at a temperature equal to or greater than the melting point of the cushioning material.

DETAILED DESCRIPTION

The steel cord and the method of manufacturing a rubber product according to the present technology will now be described with reference to the embodiments illustrated in the drawings.

Figure 1:
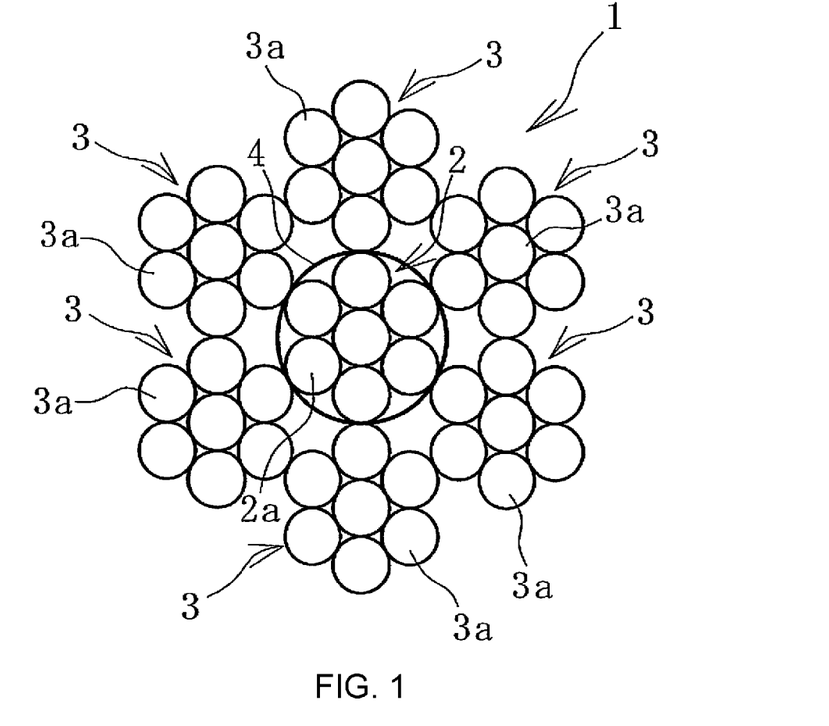
FIG. 1 is a lateral cross-sectional view illustrating a steel cord according to the present technology.

As illustrated in FIG. 1, a steel cord 1 according to the present technology has a stranded structure in which a plurality of sheath strands 3 is intertwined around the outer circumferential surface of a core strand 2. The core strand 2 is formed by intertwining a plurality of wires 2a constituted by steel wire. The sheath strands 3 are formed by intertwining a plurality of wires 3a constituted by steel wire. The outer diameters of the wires 2a, 3a is at least 0.2 mm and not greater than 1.0 mm.

The steel cord 1 according to the embodiment has a 7×7 structure. The steel cord 1 is not limited to having a 7×7 structure, and any stranded structure is possible; examples include a 7×19, 19+7×7, or 7×W(19) structure.

The outer circumferential surface of the core strand 2 is covered by a cushioning material 4 made of nonwoven fabric or a resin film. Examples of nonwoven fabric materials include polyethylene, polypropylene, polyester, and polyethylene vinyl acetate. Examples of resin film materials include polyethylene, polypropylene, polyester, and polyethylene vinyl acetate.

Figure 2:
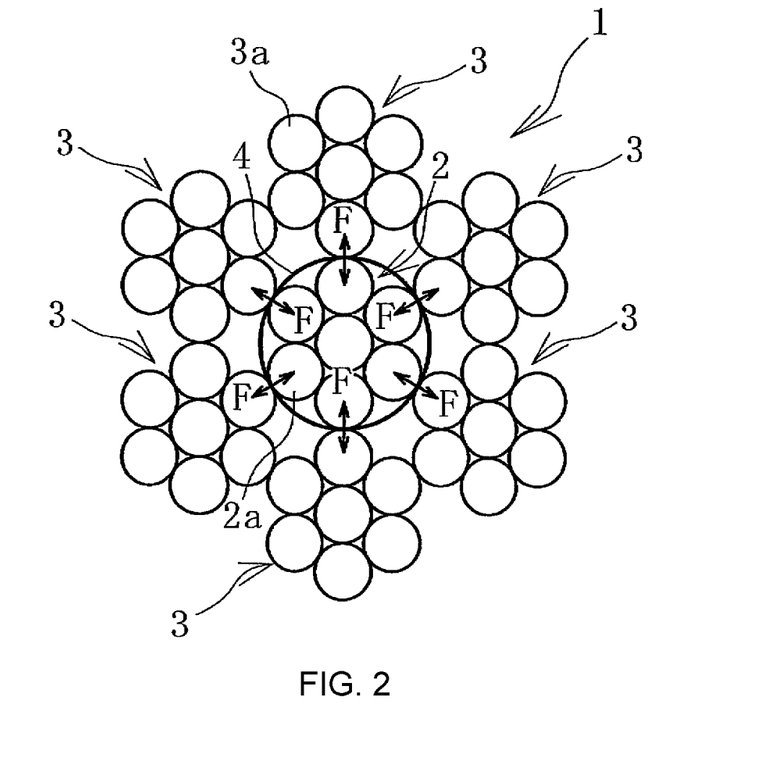
FIG. 2 is an explanatory view illustrating shear stress acting upon the steel cord depicted in FIG. 1.

As illustrated in FIG. 2, shear stress F acts between facing wires 2a, 3a of the core strand 2 and sheath strands 3 of the stranded steel cord 1. In the present technology, the outer circumferential surface of the core strand 2 is entirely covered by the cushioning material 4. The presence of the cushioning material 4 between the core strand 2 and the sheath strands 3 thus keeps the two from coming into direct contact. By virtue of this structure, the cushioning material 4 absorbs and reduces the shear stress F acting between facing wires 2a, 3a of the two to a certain degree.

Figure 3:
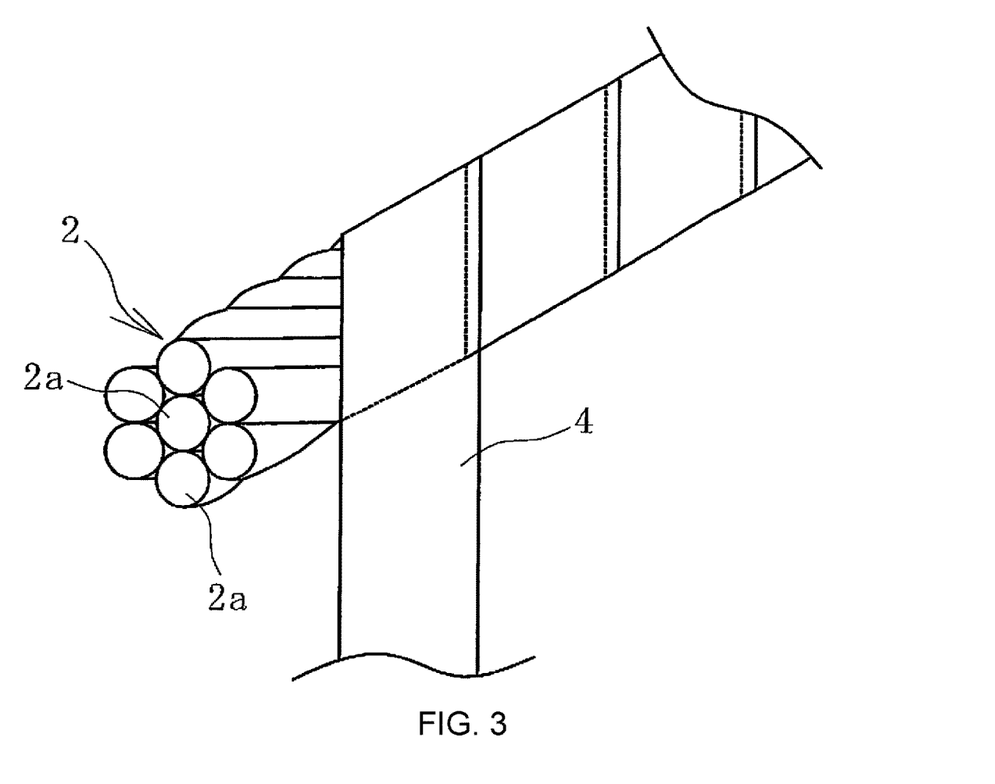
FIG. 3 is an explanatory view illustrating a process of covering the outer circumferential surface of a core strand with a cushioning material.

There is no particular limitation upon the manner in which the cushioning material 4 covers the outer circumferential surface of the core strand 2 so long as it covers the entirety thereof. For example, an arrangement in which an elongated cushioning material 4 is wrapped in a spiral pattern around the outer circumferential surface of the core strand 2, as illustrated in FIG. 3, allows for efficient manufacturing. Another possibility is for a cushioning material 4 of a predetermined length to be wrapped around the outer circumferential surface of the core strand 2 like seaweed on a sushi roll.

A method of manufacturing a rubber product using this steel cord 1 will now be described using the manufacturing of a conveyor belt as an example.

Figure 4:
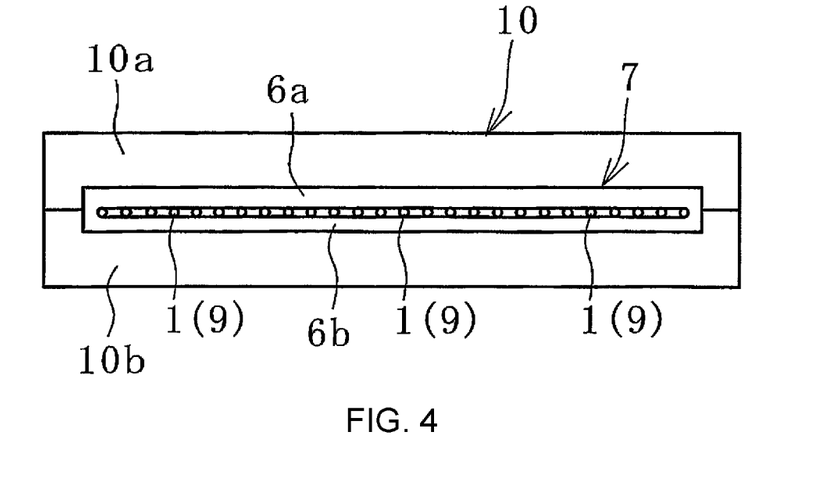
FIG. 4 is an explanatory view illustrating a method of manufacturing a rubber product according to the present technology.

First, the molded rubber article 7 illustrated in FIG. 4 is molded. In the molded rubber article 7, steel cords 1 constituting cores 9 are sandwiched between an upper rubber cover 6a (unvulcanized rubber member) and a lower rubber cover 6b (unvulcanized rubber member). The plurality of steel cords 1 is drawn and arranged in the longitudinal direction of the molded rubber article 7, and embedded between the upper rubber cover 6a and the lower rubber cover 6b in this state. Generally, unvulcanized rubber serving as an adhesive is disposed between the layer of cores 9 formed by the arrayed steel cords 1 and the layers formed by the upper rubber cover 6a and the lower rubber cover 6b.

Figure 5:
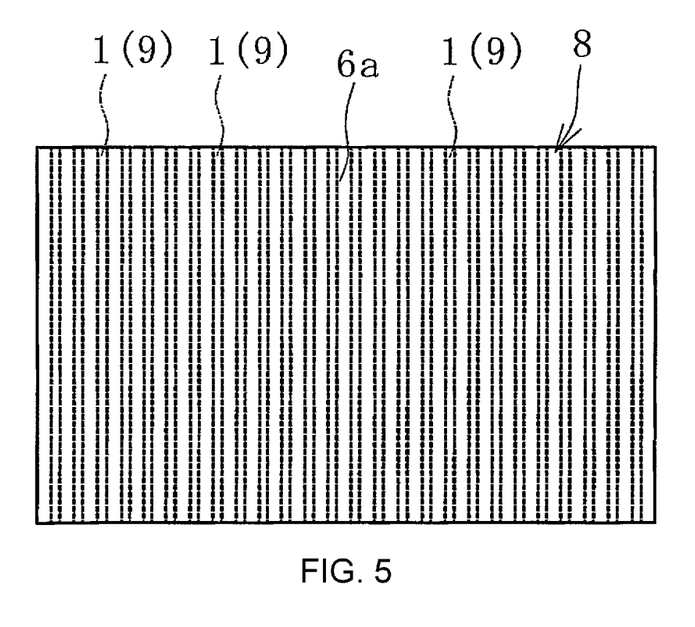
FIG. 5 is a plan view of a conveyor belt manufactured by the method described in FIG. 4.

The molded rubber article 7 is disposed between an upper die 10a and a lower die 10b of a vulcanization mold 10, and heated at a predetermined temperature and compressed at a predetermined pressure to vulcanize the unvulcanized rubber members. Performing this vulcanization process manufactures the conveyor belt 8 illustrated in FIG. 5. The plurality of steel cords 1 in the conveyor belt 8, which are disposed at predetermined intervals in the belt width direction, extend in the longitudinal direction of the belt.

The steel cords 1 are made more brittle than before by the heat of the vulcanization process. Thus, if the cushioning material 4 were not provided, the shear stress F acting between the core strand 2 and the sheath strands 3 would cause shearing to become the dominant failure mode of the steel cords 1, reducing cord strength. In the present technology, the shear stress F is absorbed and reduced to a certain degree by the cushioning material 4 despite the increased brittleness of the steel cords 1 due to the heat of the vulcanization process. This allows reductions in cord strength to be suppressed.

As a result, the diameters of the steel cords 1 can be reduced while obtaining the same cord strength. This contributes to reductions in the weight of the steel cords 1, and thus the rubber product. This is extremely valuable in the case of a conveyor belt 8, as reductions in the cord strength of the cores 9, which bear the tension when the belt is in place, can be suppressed. The reduction in the diameter of the steel cords 1 also improves bending resistance (i.e., durability against repeated bending).

If the cushioning material 4 is made of nonwoven fabric, the nonwoven fabric preferably has mass per unit area of, for example, at least 10 g/m$^2$ and not greater than 40 g/m$^2$. If mass per unit area is less than 10 g/m$^2$, the effect of mitigating the shear stress F will be diminished, making it difficult to sufficiently suppress reductions in cord strength. Mass per unit area exceeding 40 g/m$^2$ tends to negatively affect the adhesion between the steel cords 1 (core strand 2) and the vulcanized rubber. The unvulcanized rubber will also have difficulty permeating the spaces between the core strand 2 and the sheath strands 3 during the vulcanization process.

If the cushioning material 4 is made of a resin film, the film preferably has a thickness of, for example, at least 0.05 mm and not greater than 0.5 mm. If the film thickness is less than 0.05 mm, the effect of mitigating the shear stress F will be diminished, making it difficult to sufficiently minimize reductions in cord strength. A film thickness exceeding 0.5 mm tends to negatively affect the adhesion between the steel cords 1 (core strand 2) and the vulcanized rubber. The unvulcanized rubber will also have difficulty permeating the spaces between the core strand 2 and the sheath strands 3 during the vulcanization process.

Figure 6:
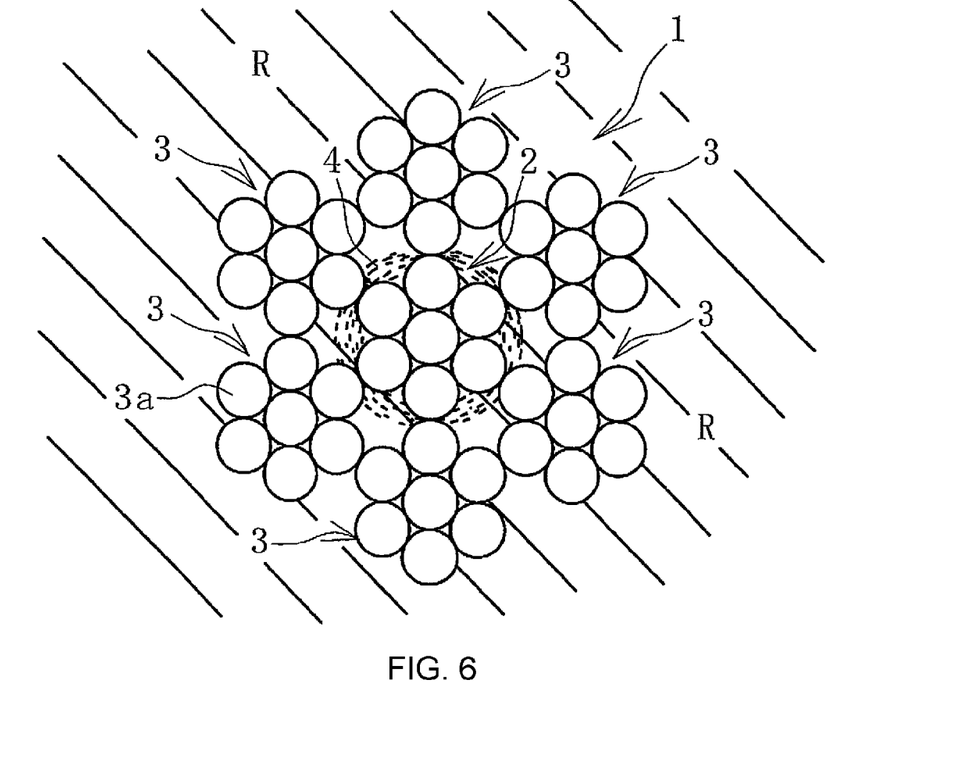
FIG. 6 is a magnified view schematically illustrating the area around a steel cord in FIG. 5.

The heating temperature during the vulcanization process is preferably equal to or greater than the melting point of the cushioning material 4. This allows the cushioning material 4 to melt and meld with the vulcanized rubber R after vulcanization, as illustrated in FIG. 6, yielding satisfactory compatibility. This allows the adhesion between the vulcanized rubber R and the steel cords 1 and the durability of the adhered portions to be maintained at satisfactory levels. The unvulcanized rubber can also permeate more easily into the spaces between the core strand 2 and the sheath strands 3, which is advantageous in terms of filling these spaces with the vulcanized rubber R.

If a nonwoven fabric is used as the cushioning material 4, the unvulcanized rubber will pass through the cushioning material 4 and relatively easy permeate the spaces between the core strand 2 and the sheath strands 3. If a resin film is used as the cushioning material 4, through-holes may be provided therein at a suitable density in order to ensure permeability on the part of the unvulcanized rubber.

The heating temperature during the vulcanization process will vary according to the size of the rubber product and the like; typically the heating temperature used when vulcanizing the rubber product will be at least 140° C. and not greater than 160° C. Thus, if the melting point of the cushioning material 4 is 160° C. or less, the cushioning material 4 can be melted by the heat of the vulcanization process.

The rubber product manufactured according to the present technology is not limited to a conveyor belt 8; various other examples of rubber products in which steel cords 1 are embedded as reinforcing material, such as tires, rubber hoses, marine hoses, and boat/ship fenders, are possible. The present technology can be especially suitably applied to the manufacturing of a conveyor belt 8 or a heavy-duty tire (for use on large construction machinery or the like), in which the importance of the cord strength of the steel cords 1 is relatively high.

EXAMPLES

Steel cords (Working Examples 1 to 5) having the same structure as illustrated in FIG. 1 and a steel cord (conventional example) from which the cushioning material of these steel cords had been removed were embedded in unvulcanized rubber (NR/SBR) under identical conditions and vulcanized for 20 minutes, and the steel cords were extracted following vulcanization and used as test samples which were measured for cord strength, breaking elongation, and air permeability. Results are shown in Table 1. Data for the conventional steel cord prior to vulcanization is included as a Reference Example. The outer diameter of the cords of the test samples was 4 mm, and a polypropylene nonwoven fabric (melting point: 160° C.) was used for the cushioning material. The nonwoven fabric cushioning material was wrapped in a spiral pattern around the outer circumferential surfaces of the core strands.

[Cord Strength] [Breaking Elongation]

Tension was placed upon the test samples in the longitudinal direction until breakage according to JIS G 3510:1992; the load at the time of breakage was measured as cord strength, and the elongation at the time of breakage as breaking elongation. [Air Permeability]

Air pressure of 100 kPa was pumped into one longitudinal end of each test sample according to the "Air Permeability Testing Method" of Australian Standard AS-1333, and the air pressure which permeated to the other end in the 60 seconds after the air pressure was pumped was measured. Results are shown in Table 1. The lower this air pressure is, the greater the air permeation resistance of the sample is, indicating superior permeability of the rubber with respect to the steel cord. An air pressure of less than 5 kPa is considered as indicating sufficient air permeation resistance.

TABLE 1

|  | Reference Example | Conventional Example | Working Examples | | | | |
|---|---|---|---|---|---|---|---|
|  |  |  | 1 | 2 | 3 | 4 | 5 |
| Mass per unit area of nonwoven fabric (g/m$^2$) | — | — | 5 | 10 | 20 | 20 | 40 |
| Vulcanization temperature (° C.) | — | 160 | 160 | 160 | 160 | 150 | 160 |
| Cord strength (kN) | 17.9 | 16.0 | 16.1 | 16.3 | 17.6 | 16.5 | 17.2 |
| Breaking elongation (%) | 3.0 | 2.7 | 2.9 | 2.6 | 2.9 | 2.8 | 2.9 |
| Air permeability (kPa) | — | 0 | 0 | 0 | 0 | 0 | 3 |

It is apparent from the results shown in Table 1 that Working Examples 1 to 5 allow for a suppression of reductions in cord strength compared to the Conventional Example. It is also apparent that the working examples have a level of air permeability that is unproblematic for practical purposes.

The invention claimed is:

1. A stranded steel cord comprising a plurality of sheath strands intertwined around an outer circumferential surface of a core strand, the outer circumferential surface of the core strand being covered by a cushioning material made of nonwoven fabric or a resin film, wherein the cushioning material is a nonwoven fabric having mass per unit area of at least 10 g/m$^2$ and not greater than 40 g/m$^2$.

2. The steel cord according to claim 1, wherein the cushioning material has a melting point of 160° C. or less.

3. The steel cord according to claim 2, wherein the cushioning material is wrapped around the core strand in a spiral pattern.

4. A method of manufacturing a rubber product, comprising the step of: vulcanizing a molded rubber article formed by embedding the steel cord described in claim 3 in an unvulcanized rubber member at a temperature equal to or greater than a melting point of the cushioning material.

5. The method of manufacturing a rubber product according to claim 4, wherein the rubber product is a conveyor belt, and the steel cord is embedded in the unvulcanized rubber member as a core.

6. The steel cord according to claim 1, wherein the cushioning material is wrapped around the core strand in a spiral pattern.

7. A method of manufacturing a rubber product, comprising the step of: vulcanizing a molded rubber article formed by embedding the steel cord described in claim 2, in an unvulcanized rubber member at a temperature equal to or greater than a melting point of the cushioning material.

8. The method of manufacturing a rubber product according to claim 7, wherein the rubber product is a conveyor belt, and the steel cord is embedded in the unvulcanized rubber member as a core.

9. A method of manufacturing a rubber product, comprising the step of: vulcanizing a molded rubber article formed by embedding the steel cord described in claim 1, in an unvulcanized rubber member at a temperature equal to or greater than a melting point of the cushioning material.

10. The method of manufacturing a rubber product according to claim 9, wherein the rubber product is a conveyor belt, and the steel cord is embedded in the unvulcanized rubber member as a core.

* * * * *